350-3.74 SR
XR 3,694,657
X 3054W

United States Patent
Brooks

[15] 3,694,657
[45] Sept. 26, 1972

[54] HOLOGRAPHIC CORRELATOR WITH A FOLDED PATH ACOUSTIC CELL INPUT

[72] Inventor: Robert E. Brooks, Redondo Beach, Calif.

[73] Assignee: TRW Inc., Redondo Beach, Calif.

[22] Filed: March 30, 1971

[21] Appl. No.: 176,090

[52] U.S. Cl. ..................250/216, 235/181, 350/3.5, 350/161, 350/162 SF

[51] Int. Cl. ............................G06g 9/00, G02f 1/32

[58] Field of Search ..250/216; 350/3.5, 162 SF, 161; 235/181; 356/71

[56] References Cited

UNITED STATES PATENTS

| | | | |
|---|---|---|---|
| 3,483,386 | 12/1969 | Jernigan | 350/3.5 |
| 3,484,147 | 12/1969 | Collier | 350/3.5 |
| 2,907,958 | 10/1959 | Skaggs | 350/161 |

OTHER PUBLICATIONS

Wenkoff et al., Applied Optics, Vol. 9, No. 1, Jan. 1970, pp. 135–147.

*Primary Examiner*—David Schonberg
*Assistant Examiner*—Ronald J. Stern
*Attorney*—Daniel I. Anderson et al.

[57] ABSTRACT

An optical signal processing system includes apparatus for identifying a complex signal by an optical matched filter. The matched filter consists of a hologram recorded by projecting coherent light through an acoustic delay line arranged to propagate an acoustic wave therein with multiple intersecting paths. This hologram is now used as the optical matched filter for identifying a signal which is impressed on the same acoustic delay line and projected on the hologram. The hologram may be so arranged as to focus the reference beam substantially in a point whenever the signal to be recorded matches the previously recorded signal.

6 Claims, 2 Drawing Figures

3694657
OR IN 250/216

Robert E. Brooks
INVENTOR.

BY Edin A. Orsu.

ATTORNEY

HOLOGRAPHIC CORRELATOR WITH A FOLDED PATH ACOUSTIC CELL INPUT

CROSS REFERENCE TO RELATED APPLICATIONS

The present application is related to a prior co-pending application of the applicant and Lee O. Heflinger and entitled "Optical System for Identifying Pulses," filed on Jan. 16, 1969, Ser. No. 791,597 and which is assigned to the assignee of the present application. The prior co-pending application discloses a type of acoustic optical system similar to that of the present invention but utilizing an optical matched filter generated by a different acoustic cell.

The present application is also related to a co-pending application of the present applicant entitled "Optical Data Recording System" filed concurrently herewith, Ser. No. 176091. This co-pending application permits recording of an electric signal which has been transformed into an acoustic wave without the use of holography.

BACKGROUND OF THE INVENTION

This invention relates generally to optical signal processing systems and particularly relates to apparatus for identifying a complex electronic signal by an optical matched filter.

It is frequently desired to process electronic signals by an optical signal processing system. If it is necessary to process the signals in real time the electronic signal must be transformed into an optical signal with negligible delay. Therefore, the usual photographic recording and processing techniques are not suited for this purpose. However, it has been proposed to obtain real time processing of signals by first converting the electronic signal into an acoustic signal which may be stored in a transparent acoustic delay line. A beam of light directed through such a delay line may be phase modulated thereby to store the signal. This is due to the fact that the acoustic wave changes the refractive index of the medium of the delay line. This, in turn, will retard the light wave more or less thereby to create a phase change.

It is is also desirable to process optically as large a portion of the signal, that is as long a time duration of the signal as possible. Obviously, the time delay which can be obtained with an acoustic delay line is proportional to its length. The length in turn is limited by the diameter of the optical beam and the optical components.

Such an optical signal processing system may also be used to obtain an optical matched filter. Such a matched filter may consist of a hologram on which a substantial portion of the signal has previously been recorded. The previously recorded signal may now be compared or correlated with another signal to determine the degree of correlation or the matching of the two signals. Such a system has been proposed in a paper by Wenkoff et al. entitled "An Improved Read-In Technique for Optical Delay Line Correlators" which appears in Applied Optics, Volume 9, No. 1, pages 135 through 147 of Jan. 1970. In this paper it is proposed to fold the optical channel, that is the optical delay line. Such a method is subject to the disadvantage previously pointed out, namely the physical size of the acoustic delay line is limited by the available size of the light beam and of the optical components. Accordingly, the amount of signal that can be stored in such a delay line is still comparatively limited.

It is accordingly an object of the present invention to provide apparatus for identifying a complex signal by an optical matched filter such as a hologram which permits to store a greater portion of the signal than previous systems.

Another object of the present invention is to provide an acoustic delay line for such a system having intersecting paths without cross talk between intersecting acoustic waves impairing the operation of the matched filter.

A further object of the present invention is to provide a system of the type discussed which will permit to compare a relatively large time segment of a complex signal previously recorded with another signal to determine the degree of correlation.

SUMMARY OF THE INVENTION

The invention relates generally to an optical signal processing system. Specifically, apparatus is provided for identifying a complex signal by an optical matched filter which is a hologram. The apparatus comprises an acoustic delay line arranged to have an acoustic wave propagated therein with multiple intersecting paths. An electronic signal generator includes means for impressing a signal to be identified on the acoustic cell. Further, a laser is provided for generating a monochromatic light beam and means for projecting the light beam through the acoustic cell which is transparent to the light beam.

A hologram on which a signal to be identified has previously been recorded through the same acoustic cell is disposed in the path of the light having passed through the acoustic cell. Finally, means are provided for detecting the light having passed the hologram to determine the correlation between the signal originally recorded on the hologram and the signal to be identified.

A similar apparatus may be used for recording a hologram suitable as an optical matched filter for signal correlation. The recording is effected by using an additional reference beam which serves the purpose to change the phase-modulated light beam into an amplitude-modulated light beam which may then be recorded on a recording medium.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing.

DESCRIPTION OF THE PREFERRED EMBODIMENT

Figure 1:
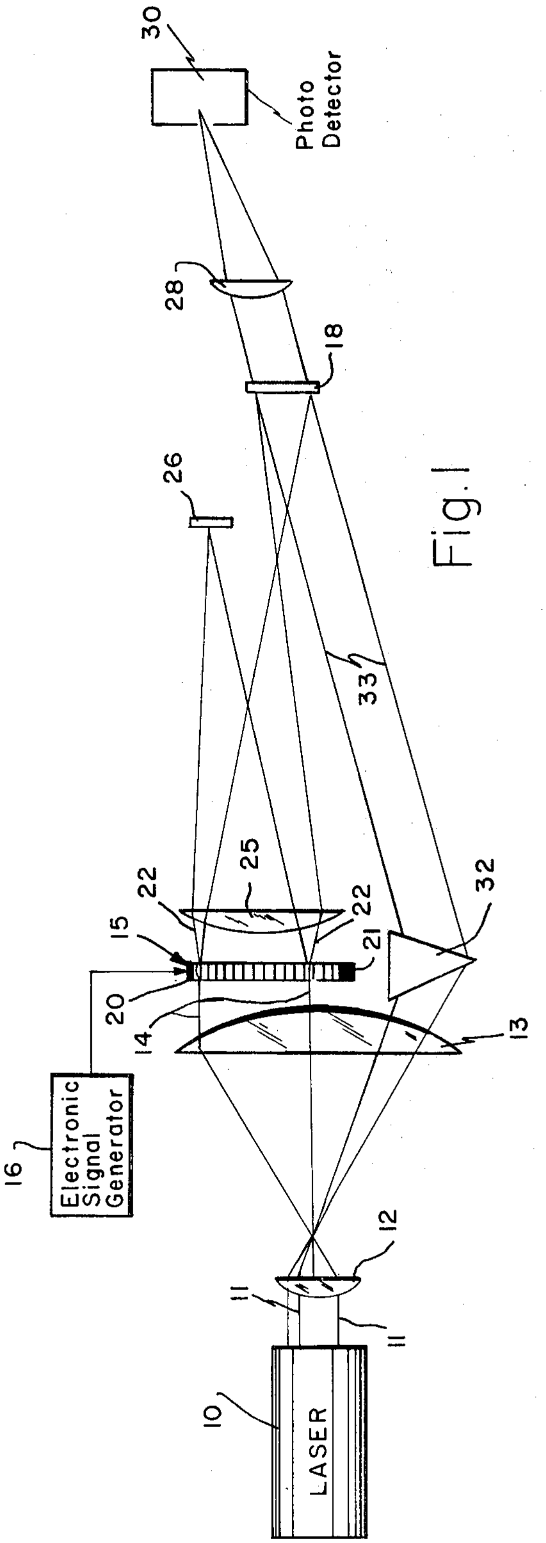
FIG. 1 is a schematic showing of apparatus for either recording a hologram to be used as a matched filter or for using the hologram to correlate a signal with a previously recorded signal.

Referring now to the drawing and particularly to FIG. 1, there is illustrated an optical data processing system including apparatus in accordance with the present invention. The apparatus of FIG. 1 includes a laser 10 for generating a light beam 11 of monochromatic light. The light beam 11 is enlarged and collimated by a lens system which may include a pair of positive lenses 12 and 13. The lenses 12 and 13 are arranged to enlarge and issue a collimated light beam having a portion 14 which is projected through an acoustic delay line or acoustic cell 15. The delay line 15 is shown in detail in FIG. 2 to which reference will be made hereinafter. The delay line 15 is transparent to the light beam 14.

An electronic signal generator 16 generates an electric signal to be compared to a previously recorded signal on a hologram 18. It will be subsequently explained how the hologram 18 is recorded. Assuming for the moment, however, that the hologram 18 has recorded thereon a particular signal with which the signal generated by the generator 16 is to be compared or which are to be correlated.

The signal generator 16 impresses the signal on a transducer 20 coupled to the cell 15 for generating in the cell an acoustic wave modulated in accordance with the signal. It will be understood that the acoustic delay line 15 is transparent to the light beam 14 and may consist of a suitable liquid or solid material. The cell 15 is provided with a suitable absorber 21 such, for example, as a lining of lead, which will absorb the acoustic wave.

The light beam 14 which is projected through the cell 15 suffers a phase modulation corresponding to the electronic signal impressed on the cell 15. This is due to the fact that the acoustic wave will change the index of refraction of the medium of the cell. This change of the index of refraction in turn will retard the light beam to a greater or lesser extent and thereby cause a phase modulation of the wave front of the light beam.

This phase-modulated light beam 22 which has passed the cell 15 is now projected on the hologram 18 by a suitable lens 25. A stop 26 may be provided in the path of the light beam 22 for stopping substantially all light except the first order diffracted light which is projected on the hologram 18.

Accordingly, the hologram 18 is now illuminated with a scene beam, that is, with a light beam modulated in accordance with the signal. If the modulation signal is identical with the signal previously recorded on the hologram 18, the original reference beam will be reconstructed from the hologram. This reference beam is now projected by means of a lens 28 on a photodetector 30. Assuming that the signal generated by the generator 16 is identical with the signal previously recorded on the hologram 18, the reference beam reconstructed through the hologram 18 will be focused substantially in a point by the lens 28 and detected by the photodetector 30. Accordingly, the intensity of the signal developed by the photodetector 30 is indicative of the degree of correlation between the signal to be matched and that originally recorded on the hologram 18.

Figure 2:
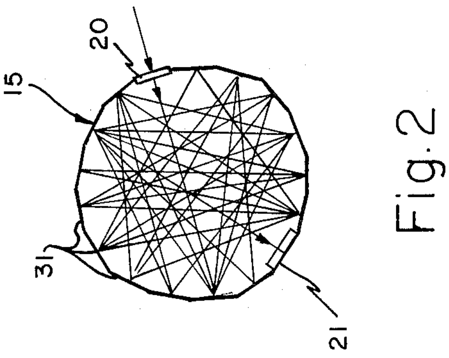
FIG. 2 is a front elevational view of an acoustic delay line having intersecting multiple paths and which may be used in the system of FIG. 1.

As previously pointed out, it is often of importance to be able to record a relatively large portion of the signal, that is a relatively large time segment of the signal. This may be effected in accordance with the present invention by making use of the delay line 15 illustrated in FIG. 2. This delay line is characterized by a large number of intersecting paths as shown in FIG. 2. To this end the delay line which may, for example, consist of quartz may have a number of adjacent flat walls such as shown at 31 which are disposed at a slight angle to each other. Each of the flat walls will reflect the acoustic wave to an opposed wall thereby to provide a very large number of intersecting paths. The absorber 21 absorbs the last acoustic wave.

For many classical applications of optical signal processing it is not permissible to fold the signal. In particular, it is not possible to use a delay line having intersecting paths. The reason is that there is cross talk between adjacent acoustic waves and even more so between waves which physically intersect each other. This, of course, will cause a distortion of the acoustic signal.

On the other hand, for the present application this type of distortion is immaterial as long as the hologram 18 was recorded by using the same acoustic cell 15 that is being used for comparing a new signal with the previously recorded signal. This arrangement, of course, is more efficient in that a larger time duration of the signal may be recorded and compared.

It will now be explained how the matched optical filter 18 is provided. As indicated before, the filter 18 is a hologram. It is recorded by impressing the signal to be recorded through the generator 16 on the transducer 20 of the cell 15 thereby to set up an acoustic wave representative of the electronic signal. The phase-modulated light wave 22 emerging from the cell 15 may be termed the scene beam which is projected on the hologram 18 as previously explained. However, it is generally not possible to record a phase-modulated wave on a photographic medium because the photographic medium is only sensitive to the amplitude of the wave. Accordingly, a reference beam may be used just as in conventional holography to change the phase-modulated scene beam into amplitude modulations by beating it with a reference wave.

The reference beam is obtained by deflecting a portion of the light having passed the lens 13, for example, by a prism 32. The prism 32 will now project a reference beam 33 on the hologram 18 and the hologram may be recorded in a conventional manner.

After the hologram has been recorded it is developed and repositioned as exactly as possible in the apparatus of FIG. 1. The apparatus is now ready as a signal processing system including the optical matched filter 18 for identifying a complex signal or correlating it with a previously recorded signal.

The system of the present invention operates well even with poor quality optical elements because as long as any signal aberrations recorded in the hologram 18 are the same as those of the signal to be compared, correlation is possible by correlating an aberrated signal against the stored aberrated signal on the hologram. It should be noted that only the optics of the reference beam 33 must be of high quality so that the reference beam may be focused by the lens 28 in a small diameter to be detected by the photodetector 30. This in turn means that the configuration of the scene beam is of lesser importance.

The hologram 18 is recorded with a short laser pulse so that the acoustic wave does not appreciably move while the recording is made. Too long a light pulse might cause fringe motion during the exposure.

It will be evident that a number of signals may be stored simultaneously on the same hologram 18. As is conventional, the arrangement may be made in such a manner that each stored signal will cause a reference beam to focus at a different spot so that an array of detectors may be used, each for detecting one of the previously stored signals. In each case, the reference beam is proportional to the cross-correlation product of the original stored signal and the signal to be compared.

There has thus been disclosed an optical signal processing system including apparatus for identifying a complex signal by an optical matched filter. The matched filter consists of a hologram on which a signal has previously been recorded. The system includes an optical transducer consisting of a delay line with multiple intersecting paths. This makes it possible to record a large portion of a signal and to compare it with a similarly large portion of a signal to be identified. The optics of the system for recording the signal and for projecting a scene beam indicative of a signal to be compared need not be particularly aberration free. However, the optics for the reference beam must be of high quality. This portion of the optics, however, is only needed for recording the hologram and not for the signal comparison.

What is claimed is:

1. In an optical signal processing system, apparatus for identifying a complex signal by an optical matched filter, said apparatus comprising:

a. an acoustic delay line arranged to propagate an acoustic wave therein along a folded acoustic path having a plurality of linear portions, each of the portions intersecting a plurality of other portions;

b. an electronic signal generator including means for impressing a signal to be identified on said acoustic cell;

c. a laser for generating a monochromatic light beam;

d. means for projecting said light beam through said acoustic cell, said cell being transparent to said light beam;

e. a hologram on which a signal to be identified has previously been recorded through said acoustic cell, said hologram being disposed in the path of the light beam having passed through said acoustic cell; and f. means for detecting the light output of said hologram to determine the correlation between the signal originally recorded on said hologram and the signal to be identified.

2. Apparatus as defined in claim 1 wherein a stop is provided in the path of the light beam having passed said acoustic cell, said stop being positioned to stop substantially all light except the first order diffracted light.

3. Apparatus as defined in claim 1 wherein said means for detecting includes a photodetector and a lens for imaging the light having passed said hologram on said photodetector.

4. Apparatus as defined in claim 1 wherein said acoustic cell has a multiplicity of walls disposed at an angle, each wall reflecting the acoustic wave to create said plurality of linear portions.

5. Apparatus for recording a hologram suitable as an optical matched filter for signal correlation, said apparatus comprising:

a. an acoustic cell arranged to propagate therein an acoustic wave along a folded acoustic path having a plurality of linear portions, each of the portions intersecting a plurality of other portions;

b. a laser for generating a monochromatic light beam and projecting it through said acoustic cell, said cell being transparent to said light beam;

c. a recording medium disposed in the path of the light beam having passed said acoustic cell;

d. means for diverting a portion of said light beam and projecting it onto said recording medium to provide a reference beam; and e. an electronic signal generator including means for impressing a signal to be recorded onto said acoustic cell.

6. Apparatus as defined in claim 1 wherein a stop is provided in the path of the light beam having passed said acoustic cell, said stop being positioned for intercepting substantially all light but the first order diffracted light.

* * * * *

UNITED STATES PATENT OFFICE

CERTIFICATE OF CORRECTION

Patent No. 3,694,657 Dated December 12, 1972

Inventor(s) Robert E. Brooks

It is certified that error appears in the above-identified patent and that said Letters Patent are hereby corrected as shown below:

In the heading [22] the filed date "March 30, 1971" should be cancelled and --August 30, 1971-- inserted therefor.

Signed and sealed this 27th day of March 1973.

(SEAL)
Attest:

EDWARD M.FLETCHER,JR.
Attesting Officer

ROBERT GOTTSCHALK
Commissioner of Patents